United States Patent
Pawanekar et al.

(10) Patent No.: US 12,468,978 B2
(45) Date of Patent: Nov. 11, 2025

(54) REINFORCEMENT LEARNING IN A PROCESSING ELEMENT METHOD AND SYSTEM THEREOF

(71) Applicant: US Technology International Pvt. Ltd., Trivandrum (IN)

(72) Inventors: Sameer Sadashiv Pawanekar, Indore (IN); Upendra Narayan Tripathi, Bangalore (IN)

(73) Assignee: US Technology International Pvt. Ltd., Trivandrum (IN)

( * ) Notice: Subject to any disclaimer, the term of this patent is extended or adjusted under 35 U.S.C. 154(b) by 967 days.

(21) Appl. No.: 17/454,551

(22) Filed: Nov. 11, 2021

(65) Prior Publication Data

US 2023/0087326 A1 Mar. 23, 2023

(30) Foreign Application Priority Data

Sep. 22, 2021 (IN) .............................. 202141042994

(51) Int. Cl.
    *G06N 20/00* (2019.01)
    *G06N 5/02* (2023.01)

(52) U.S. Cl.
    CPC .............. *G06N 20/00* (2019.01); *G06N 5/02* (2013.01)

(58) Field of Classification Search
    CPC ............ G06N 20/00; G06N 5/02; G06N 3/04; G06N 3/092; G06N 3/08
    See application file for complete search history.

(56) References Cited

U.S. PATENT DOCUMENTS

2015/0100530 A1* 4/2015 Mnih ....................... G06N 3/08
    706/25

OTHER PUBLICATIONS

Naruse et al, "Scalable photonic reinforcement learning by time-division multiplexing of laser chaos", 2018 (Year: 2018).*
Wang et al, "A Many-Core Accelerator Design for On-Chip Deep Reinforcement Learning", 2020 (Year: 2020).*
Siddiqi et al, "Deep Q-Learning Based Optimization of VLC Systems With Dynamic Time-Division Multiplexing", 2020 (Year: 2020).*
Grinsztajn et al, "Geometric deep reinforcement learning for dynamic DAG scheduling", Dec. 2020 (Year: 2020).*

* cited by examiner

*Primary Examiner* — Michael J Huntley
*Assistant Examiner* — Christopher Dillon Devore
(74) *Attorney, Agent, or Firm* — Workman Nydegger

(57) ABSTRACT

A method of reinforcement learning in a processing element, the method including receiving, by a receiving module, one reward. Further, a computing module computes a Q-value for a first dimension at time $t_n$, based on the reward. The Q-value is locally stored. A time-division multiplexing module replaces the computed Q-value for the first dimension with at least one Q-value computed for a second dimension at time $t_{n+1}$. The second dimension is different than the first dimension.

12 Claims, 7 Drawing Sheets

REINFORCEMENT LEARNING IN A PROCESSING ELEMENT METHOD AND SYSTEM THEREOF

TECHNICAL FIELD

The present disclosure generally relates to reinforcement learning, and particularly relates to methods and systems in a processor for implementing reinforcement learning operations.

BACKGROUND

Machine learning is a branch of AI providing computers the ability to learn without necessitating explicit functional programming. Machine learning emphasizes on the development of (artificially intelligent) learning agents that could tweak their actions and states dynamically and appropriately when exposed to a new set of data. Reinforcement learning is a type of machine learning where a reinforcement learning agent learns, overtime, to behave optimally in a certain environment by interacting continuously in the environment. The agent during its course of learning experience various different situations in the environment it is in. These are called states. The agent while being in that state may choose from a set of allowable actions which may fetch different rewards (or penalties). The learning agent overtime learns to maximize these rewards to behave optimally at any given state it is in.

Q-learning is a techniques used to perform reinforcement learning. In Q-learning, the reinforcement learning agent attempts to learn an optimal policy based on the past information corresponding to the interaction between the reinforcement learning agent and reinforcement learning environment. The reinforcement learning agent learns to carry out actions in the reinforcement learning environment to maximize the rewards achieved or to minimize the costs incurred. Q-learning estimates the action-value function that further provides the expected utility of performing a given action in a given state and following the optimal policy thereafter. Thus, by finding the optimal policy, the agents can perform actions to achieve maximum rewards.

Q-learning uses action values which are termed as Q-values to iteratively improve the behavior of the learning agent. Q-values are defined for states and actions. Q (s, a) is an estimation of how good it is to take the action 'a' at the state 's'.

The Q-Learning method, if implemented on hardware it may speed up the computations in systems that require AI applications. Hardware implementation of Q-Learning processes large volume of data in a shorter run time. The implementation of Q-learning accelerates the processing and obtains an optimal policy in a faster way. However, when the AI application requires a higher number of computation of Q-values, the processor required to process the higher number of computation of Q-values will require large architecture and be more complex. The processor architecture design will become more complex and require more area for creating the processors to handle the higher number of computation of Q-values.

There is a need for a solution to increase the scalability of the processor architecture without compromising the design complexity and with reduced area. Also, it is desired to compute the Q-values in the hardware processor efficiently.

Thus, in view of the drawbacks discussed hitherto, there was felt a need for a processor architecture specifically designed to increase scalability for executing reinforcement learning operations without increasing the hardware.

SUMMARY

This summary is provided to introduce a selection of concepts in a simplified format that are further described in the detailed description of the present disclosure. This summary is not intended to identify key or essential inventive concepts of the claimed subject matter, nor is it intended for determining the scope of the claimed subject matter. In accordance with the purposes of the disclosure, the present disclosure as embodied and broadly described herein, describes method and system for generating a core dump in a UE.

In accordance with some example embodiments of the inventive concepts, a method of reinforcement learning in a processing element, the method includes receiving, by a receiving module, at least one reward. Further, computing, by a computing module, at least one Q-value for a first dimension at time tn, based on the at least one reward. Then storing, by the computing module, the at least one Q-value. The method includes, replacing, by a time-division multiplexing module, the at least one Q-value for the first dimension with at least one Q-value computed for a second dimension at time tn+1, wherein the second dimension is different than the first dimension In accordance with some example embodiments of the inventive concepts, a system of reinforcement learning in a processing element, the system including, a receiving module configured to receive a reward from a host. Further, a computing module in communication with the receiving module is and configured to compute a Q-value for a first dimension at time tn, based on the at least one reward; wherein the computing module is further configured to store the at least one Q-value. The system include a time-division multiplexing module in communication with the computing module and is configured to replace the at least one Q-value for the first dimension with at least one Q-value computed for a second dimension at time tn+1, wherein the second dimension is different than the first dimension.

In an alternative embodiment of the inventive concepts, a processing element configured to perform reinforcement learning, the processing element includes, a receiving module configured to receive a reward from a host. Further, a computing module in communication with the receiving module is and configured to compute a Q-value for a first dimension at time tn, based on the at least one reward; wherein the computing module is further configured to store the at least one Q-value. The processing element include a time-division multiplexing module in communication with the computing module and is configured to replace the at least one Q-value for the first dimension with at least one Q-value computed for a second dimension at time tn+1, wherein the second dimension is different than the first dimension.

These aspects and advantages will be more clearly understood from the following detailed description taken in conjunction with the accompanying drawings and claims.

Figure 1:
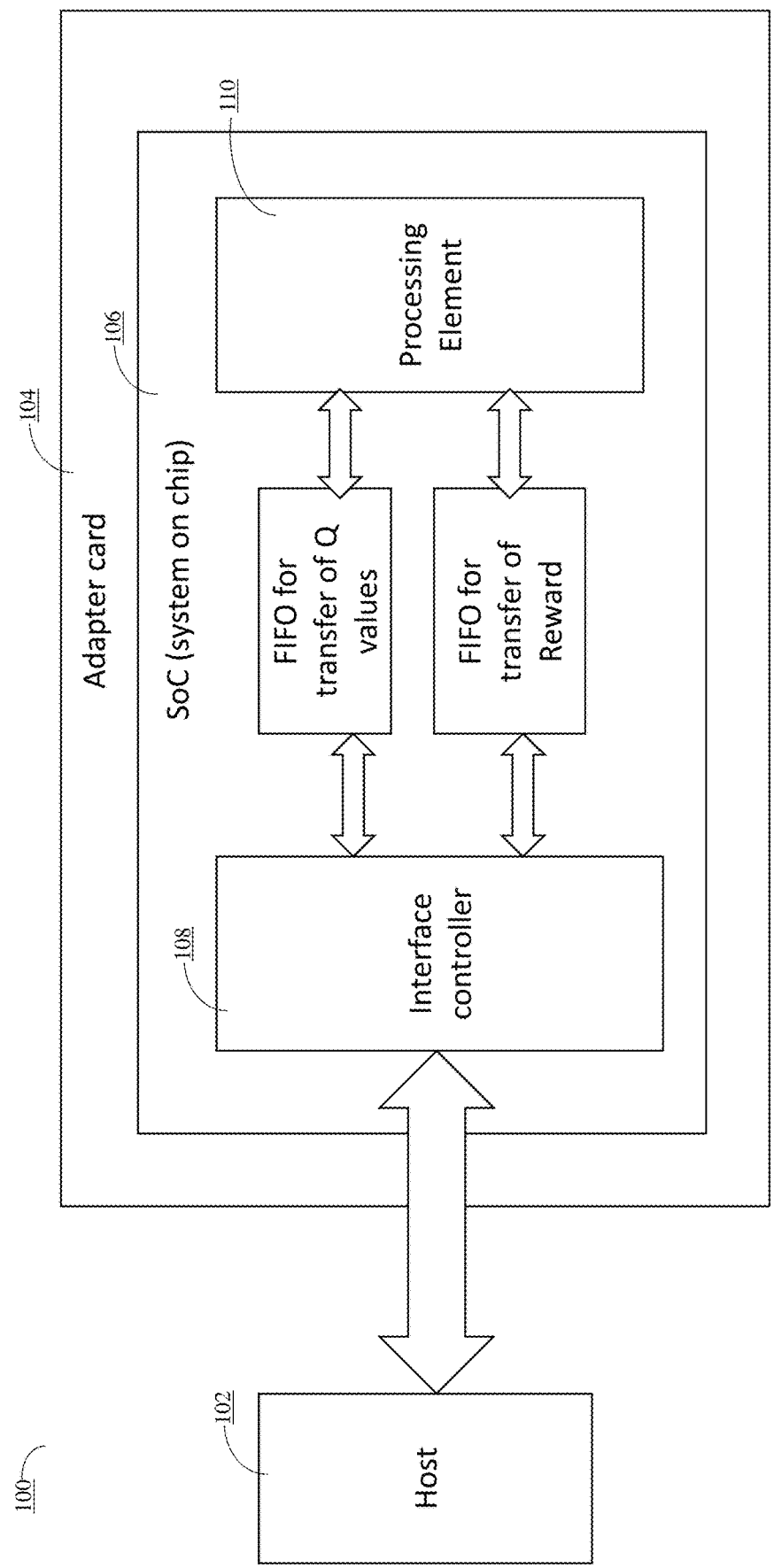
FIG. 1 illustrates an environment of implementation of a method and system of reinforcement learning in a System on Chip (SoC) incorporating a reinforcement learning processing element in accordance with an embodiment of the present subject matter.

Further, skilled artisans will appreciate that elements in the drawings are illustrated for simplicity and may not have necessarily been drawn to scale. For example, the flow charts illustrate the method in terms of the most prominent steps involved in help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this invention belongs. The system, methods, and examples provided herein are illustrative only and not intended to be limiting.

For the sake of clarity, the first digit of a reference numeral of each component of the present disclosure is indicative of the Figure number, in which the corresponding component is shown. For example, reference numerals starting with digit "1" are shown at least in FIG. 1. Similarly, reference numerals starting with digit "2" are shown at least in FIG. 2, and so on and so forth.

Embodiments of the present subject matter are described below in detail with reference to the accompanying drawings.

The present subject matter discloses a processing element that has been specifically configured to execute reinforcement learning operations by the way of implementing an instruction set which incorporates instructions specifically designed for the implementation of reinforcement learning tasks/operations.

The instructions disclosed in the present subject matter, when executed by the reinforcement learning processing element perform predetermined reinforcement learning activities directed onto either a reinforcement learning agent or a corresponding reinforcement learning environment specified as a part of the instructions.

In accordance with an exemplary embodiment of the present subject matter, the instructions when executed by the processing element, trigger the reinforcement learning agent to interact with a corresponding reinforcement learning environment and further enable the reinforcement learning agent to explore the reinforcement learning environment and deduce relevant learnings from the reinforcement learning environment. Additionally, instructions also provide for the deduced learnings to be iteratively applied onto the reinforcement learning environment to deduce furthermore learnings therefrom.

FIG. 1 illustrates a block diagram depicting an environment 100 of implementation of a method and system of reinforcement learning in the processing element 110. In an embodiment of the invention, the environment 100 includes for example, a host 102, an adapter card 104, a System on Chip (SoC) 106, a I/O controller 108, the processing element 110. The I/O controller 108 and the processing element 110 together form the SoC 106 configured over the adapter card 104. The host 102 is in communication with the I/O controller 108 to exchange data. The I/O controller 108 is in communication with the processing element 110 thus transferring data from the host 102 to the processing element 110. The data may be including, a reward, a computed Q-value provided to the processing element 110.

Figure 2:
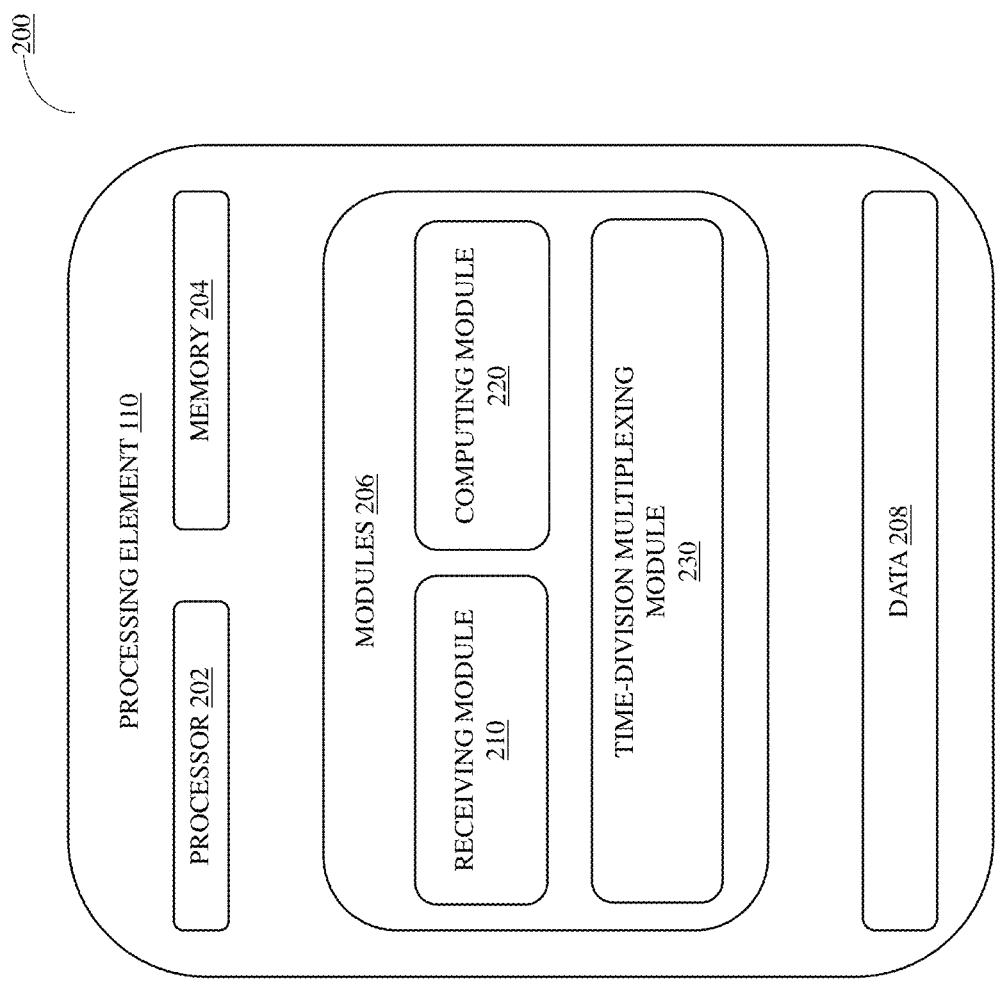
FIG. 2 illustrates a block diagram of the system of reinforcement learning in a processing element, in accordance with an embodiment of the present subject matter.

FIG. 2 illustrates a block diagram of the system 200 of reinforcement learning in a processing element, according to an embodiment of the present subject matter. In an embodiment of the invention, the system 200 but is not limited to, a processor 202, a memory 204, and data 208. The system further includes modules 206 which along with the memory 204 may be coupled to the processor 202.

In an embodiment, the modules 206 may include a receiving module 210, a computing module 220 and a time-division multiplexing (TDM) module 230. The receiving module 210, a computing module 220 and a time-division multiplexing (TDM) module 230, may be in communication with each other. The data 208 serves, amongst other things, as a repository for storing data processed, received, and generated by one or more of the modules 206.

The modules 206, amongst other things, include routines, programs, objects, components, data structures, etc., which perform particular tasks or implement data types, according to embodiments of the present subject matter. The modules 206 may also be implemented as, signal processor(s), state machine(s), logic circuitries, and/or any other device or component that manipulate signals based on operational instructions.

Further, the modules 206 can be implemented in hardware, instructions executed by a processing unit, or by a combination thereof. The processing unit can comprise a computer, a processor, such as the processor 202, a state machine, a logic array, or any other suitable devices capable of processing instructions. The processing unit can be a general-purpose processor which executes instructions to cause the general-purpose processor to perform the required tasks or, the processing unit can be dedicated to performing the required functions. In another embodiment of the present disclosure, the modules 206 may be machine-readable instructions (software) which, when executed by a processor/processing unit, perform any of the described functionalities.

Figure 3:
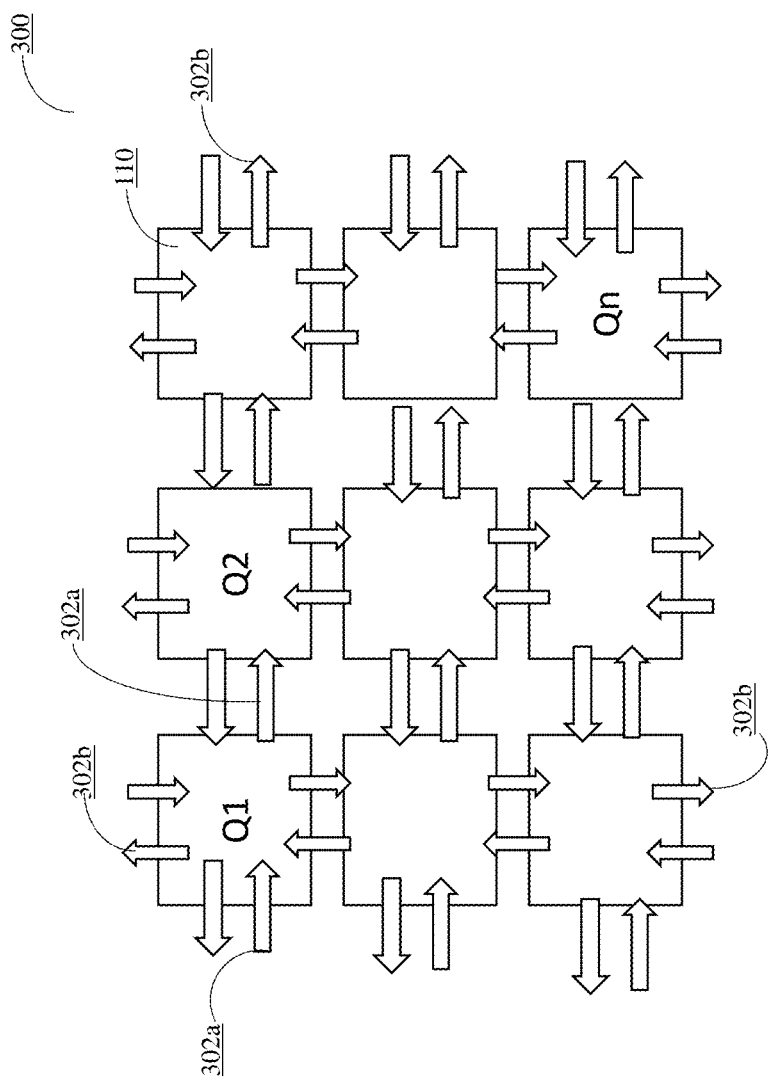
FIG. 3 illustrates a block diagram of the processing element arranged in an array structure depicting flow of a data, in accordance with an embodiment of the present subject matter.

Referring to FIG. 3, illustrates a block diagram of the processing element 110 arranged in an array structure 300 depicting flow of data, according to an embodiment of the present subject matter. The plurality of processing element 110 are arranged in a N×N array structure 300. Each of the processing element 110 represents the state in the context of reinforcement learning. Thus, the processing element 110 computes a Q-value for the implementation of reinforcement learning. Each of the processing element 110 computes the next Q-value.

Referring to FIG. 1. FIG. 2 and FIG. 3, in an example embodiment of the present invention, a 3×3 array structure 300 of the processing element 110 is presented. The processing element 110 which are also six states from Q1 to Qn. Qn contains the reward which is the destination of the reinforcement learning agent. In an example, the reinforcement learning agent is a robotic element. The objective of the robot element is to reach state Qn and the robot element may start from any state. The outward move action 302b from the state is prohibited for the robot element. The inward move action 302a within the state space, can be taken and has a positive reward. The reward for outward move action 302b from the state space is negative, whereas the reward for reaching the state Qn is positive number, as indicated by a reward matrix:

$$r = \begin{bmatrix} -500 & 0 & -500 & 0 \\ -500 & 0 & 0 & 0 \\ -500 & 100 & 0 & -500 \\ 0 & -500 & -500 & 0 \\ 0 & -500 & 0 & 100 \\ 0 & -500 & 0 & -500 \end{bmatrix}$$

The receiving module 210 in the processing element 110 is configured to receive the reward from the host 102. Each of the processing element 110 receives the reward in a serial order.

Figure 4:
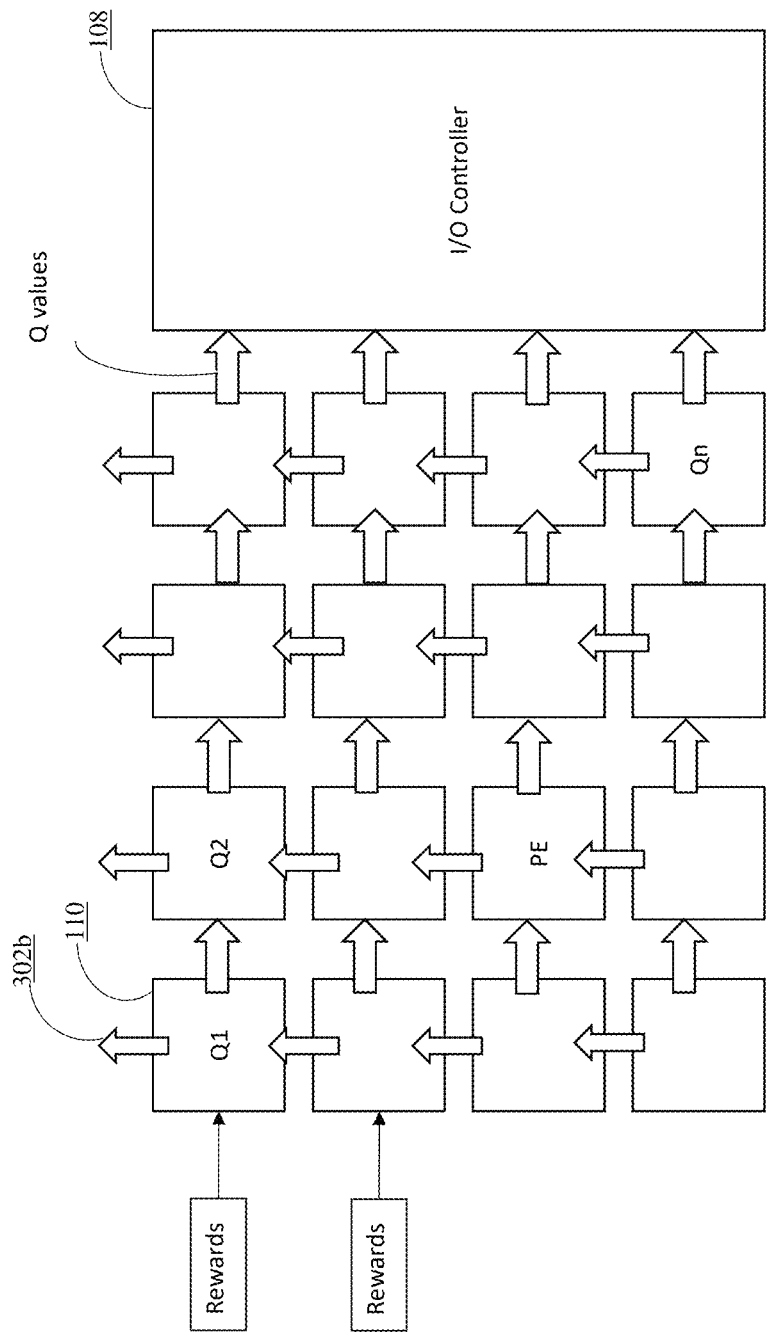
FIG. 4 illustrates a block diagram of the processing element arranged in the array structure depicting flow of the data with a I/O controller, in accordance with an embodiment of the present subject matter.

Referring to FIG. 4 illustrates a block diagram of the processing element 110 arranged in the array structure 300 depicting flow of the data to the I/O controller 108, according to an embodiment of the present subject matter. In an embodiment of the invention, as the reward is provided to the receiving module 210 in the processing element 110, the processing element 110 starts the Q-value computing process. The computing module 220 in communication with the receiving module 210 is configured to compute the Q-value. The Q-value is computed for a first dimension at time tn. In an example embodiment the first dimension is the movement of the agent from one of the processing element 110 to another processing element 110 based on the reward. The computing module 220 is configured to store the computed Q-value.

In an example embodiment the computing module 220 is in communication with the memory 204 and is configured to transmit the computed Q-value at tn for the first dimension to the memory 204 for storing.

In an embodiment of the invention, the Q-value is calculated by the computing module 220 using:

```
1:   Q ← Q₀ (s₀ⁿ, a₀ⁿ)
2:   while k < steps do
3:       Draw an action aₖᶻ for state sₖⁿ
4:       Perform an action aₖᶻ
5:       Observe state sₖ₊₁ⁿ and solve the equation
6:       Q_{k+1}(sₖⁿ, aₖᶻ) = Q_k(sₖⁿ, aₖᶻ) +
7:       α[r(sₖⁿ, aₖᶻ)+
8:       γmax(Q(sₖ₊₁ⁿ, aₖ₊₁ᶻ) − Q_k(sₖⁿ, aₖᶻ))]
9:       sₖ ← sₖ₊₁
10:  end while
```

$s_k$ represents the state of the environment;

$a_k$ is a representation of action in the state $s_k$;

$r_{k+1}$ is numerical reward, which is the result of action $a_k$;

$s_{k+1}$ represents the new state.

Further, the computing module 220 is configured to repeat the Q-value computation of every possible dimension of the processing element 110. Therefore, the computing module 220 now computes the Q-value computed for a second dimension at time tn+1. The second dimension is being different than the first dimension. In an embodiment of the invention, the input-output controller 108 in communication with the processing element 110 and is configured to receive and accumulate the Q-value from the processing element in a serial order.

Figure 5:
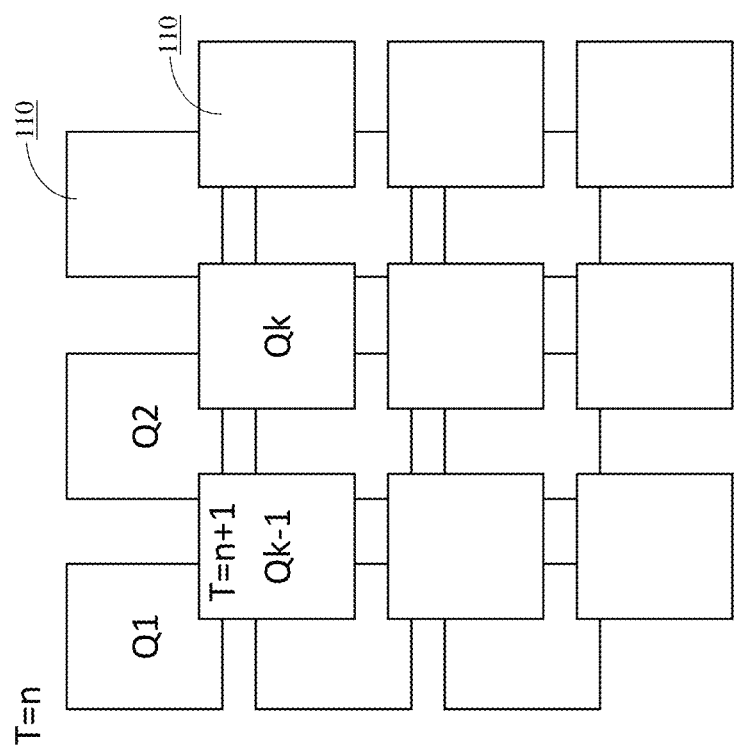
FIG. 5, illustrates a block diagram of the processing element arranged in the array structure performing time-division multiplexing and computing the Q-value at different time intervals, in accordance with an embodiment of the present subject matter.

Referring to FIG. 5, illustrates a block diagram of the processing element 110 arranged in the array structure 300 performing time-division multiplexing and computing the Q-value, according to an embodiment of the present subject matter. In an example embodiment, the present subject matter discloses the three-dimensional Q-value computation mapping to the processing element 110 in the two-dimension using the time-division multiplexing.

In an embodiment of the invention, the time-division multiplexing module 230 is in communication with the computing module 220 and is configured to replace the Q-value computed for the first dimension at to with the Q-value computed for the second dimension at time tn+1. In an example embodiment, time-division multiplexing module 230 performs time-division multiplexing to replace the Q-value of the first dimension by the computed Q-value of the second dimension thus allowing the processing element 110 to process higher Q-value computations with limited hardware.

In an example, the array structure 300 may be the 3×3 array structure with six processing elements 110 represented as six states in the two-dimensional array. Each of the processing element 110 may have four actions i.e., left, right, bottom and top movement. That is the agent may perform these four actions in the two-dimensional array. Now, if the actions are more than four, i.e., if the agent have to perform action in z+ or z− direction thus increasing the number of actions then a third dimension would be required to represent the actions. In the present invention, the time-division multiplexing module 230 may perform time-division multiplexing to replace the computed Q-value of two-dimension with the three-dimension computed Q-value.

Figure 6:
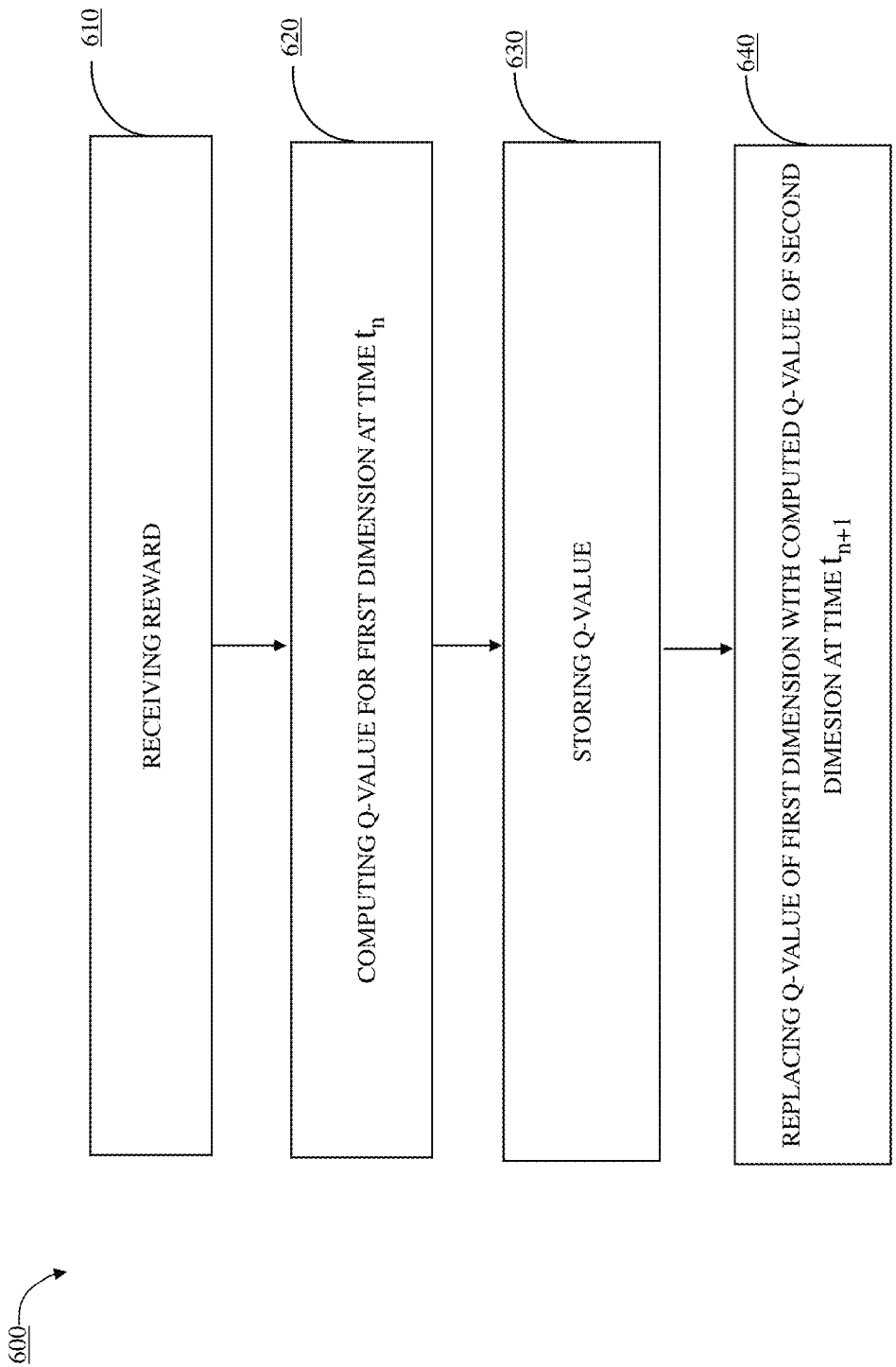
FIG. 6 illustrates a flowchart of the method of reinforcement learning in a processing element, in accordance with an embodiment of the present subject matter.

FIG. 6 illustrates a flowchart of a method 600 of reinforcement learning in a processing element 110, according to an embodiment of the present subject matter. The method 600 may be a computer-implemented method executed, for example, by the processing element 110. For the sake of brevity, constructional and operational features of the system 200 that are already explained in the description of FIG. 1-5 are not explained in detail in the description of FIG. 6.

At step 610, the rewards are received by the receiving module from the host. The rewards are received for computation of Q-value.

At step 620, the Q-value is computed by the computation module. The Q-value is computed for the first dimension at time tn.

In continuance with the above step, at step 630, the computed Q-value of the first dimension at time tn is then stored in the memory. Then, further next Q-value is calculated for the second dimension at time tn+1.

Further, at step 640, the computed Q-value of first dimension at time tn is replaced by the time-division multiplexing module performing time-division multiplexing with the computed Q-value of the second dimension at time tn+1.

Figure 7:
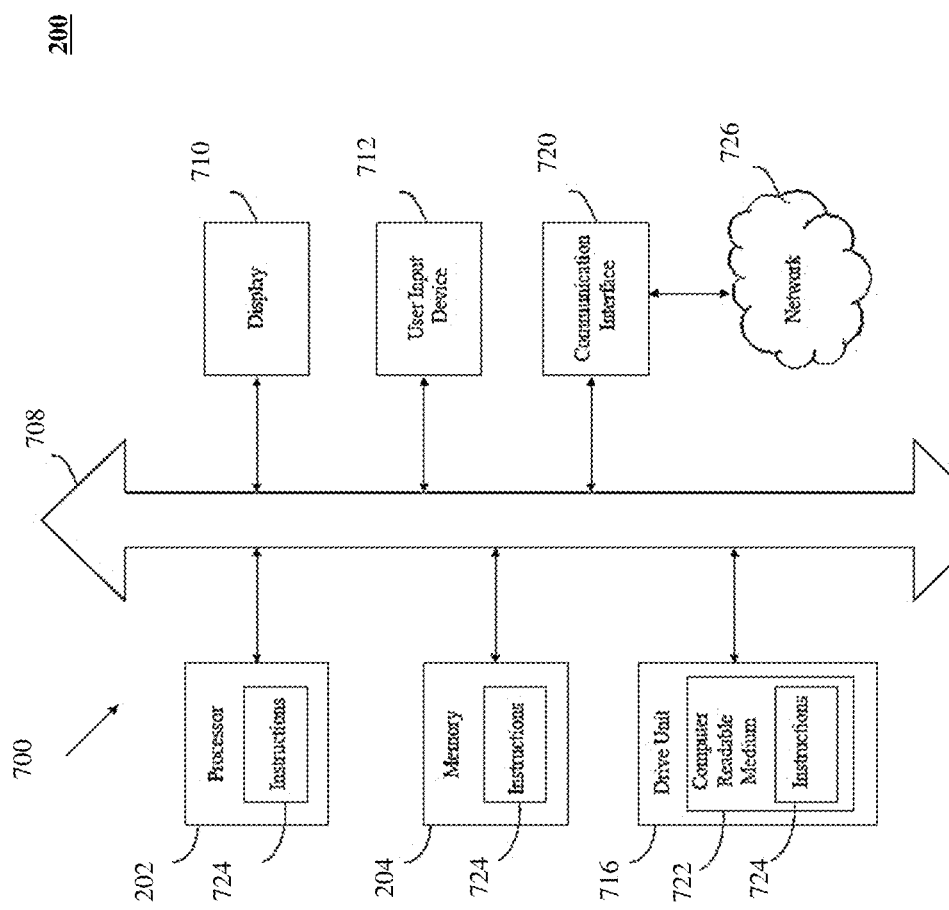
FIG. 7 illustrates a computing device implementation, according to an embodiment of the present disclosure.

FIG. 7 illustrates a computing device implementation of the system and method of the present subject matter, according to an embodiment of the present disclosure.

The present figure essentially illustrates the hardware configuration of the system 200 in the form of a computer system 700. The computer system 700 may include a set of instructions that can be executed to cause the computer system 700 to perform any one or more of the methods disclosed. The computer system 700 may operate as a standalone device or may be connected, e.g., using a network, to other computer systems or peripheral devices.

In a networked deployment, the computer system 700 may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a personal digital assistant (PDA), a mobile device, a palmtop computer, a laptop computer, a desktop computer, a communications device, a handheld device, a wireless telephone, a land-line telephone, a web appliance, a network router, switch or bridge, or any other machine capable of executing a set of instructions (sequential or otherwise) that specify actions to be taken by that machine. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 202 (e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, application specific integrated circuits, field programmable gate arrays, servers, networks, digital circuits, Analog circuits, combinations thereof, or other now known or later developed devices for analysing and processing data The processor 202 may implement a software program, such as code generated manually (i.e., programmed).

The computer system 700 may include a memory 204, such as a memory 204 that can communicate via a bus 708. The memory 204 may be a main memory, a static memory, or a dynamic memory. The memory 204 may include but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media, and the like. In one example, the memory 204 includes a cache or random-access memory for the processor 202. In alternative examples, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described may be performed by the programmed processor 202 executing the instructions stored in the memory 204. The functions, acts or tasks are independent of the instructions set, storage media, processor or processing strategy and may be performed by software, hardware, integrated circuits, firmware, micro-code and the like, operating alone or in combination. Likewise, processing strategies may include multiprocessing, multitasking, parallel processing, and the like.

As shown, the computer system 700 may or may not further include a display unit 710, such as a liquid crystal display (LCD), an organic light emitting diode (OLED), a flat panel display, a solid-state display, a cathode ray tube (CRT), a projector, a printer or other now known or later developed display device for outputting determined information. The display 710 may act as an interface for the user to see the functioning of the processor 202, or specifically as an interface with the software stored in the memory 204 or in the drive unit 716.

Additionally, the computer system 700 may include an input device 412 configured to allow a user to interact with any of the components of system 700. The input device 712 may be a number pad, a keyboard, or a cursor control device, such as a mouse, or a joystick, touch screen display, remote control, or any other device operative to interact with the computer system 700.

The computer system 700 may also include a disk or optical drive unit 716. The disk drive unit 716 may include a computer-readable medium 722 in which one or more sets of instructions 724, e.g., software, or modules 206 can be embedded. Further, the instructions 724 may embody one or more of the methods or logic as described above. In a particular example, the instructions 724 may reside completely, or at least partially, within the memory 204 or within the processor 202 during execution by the computer system 700. The memory 204 and the processor 202 also may include computer-readable media as discussed above.

The present invention contemplates a computer-readable medium that includes instructions 724 or receives and executes instructions 724 responsive to a propagated signal so that a device connected to a network 726 can communicate voice, video, audio, images or any other data over the network 726. Further, the instructions 724 may be transmitted or received over the network 726 via a communication port or interface 720 or using a bus 708. The communication port or interface 720 may be a part of the processor 202 or may be a separate component. The communication port 720 may be created in software or may be a physical connection in hardware. The communication port 720 may be configured to connect with a network 726, external media, the display 710, or any other components in computer system 700 or combinations thereof. The connection with the network 726 may be a physical connection, such as a wired Ethernet connection or may be established wirelessly as discussed later. Likewise, the additional connections with other components of the computer system 700 may be physical connections or may be established wirelessly. The network 726 may alternatively be directly connected to the bus 708.

The network 726 may include wired networks, wireless networks, Ethernet AVB networks, or combinations thereof. The wireless network may be a cellular telephone network, an 802.11, 802.16, 802.20, 802.1Q or WiMax network. Further, the network 1426 may be a public network, such as the Internet, a private network, such as an intranet, or combinations thereof, and may utilize a variety of networking protocols now available or later developed including, but not limited to TCP/IP based networking protocols.

In an example, dedicated hardware implementations, such as application specific integrated circuits, programmable logic arrays and other hardware devices, can be constructed to implement various parts of the system 200. A detailed implementation of the system 200 is as explained in the above paragraphs.

In an example embodiment of the present subject matter, the following advantages are obtained with the implementation of the solution disclosed in this present subject matter:

Scalability of the processor architecture is increased without increasing the hardware requirement;

Hardware with the present solution requires reduced area as compared to the parallel implementation techniques:

The present solution has easy implementation and lesser design complexity;

The present solution provides easier VLSI routing due to its proposed regular structure;

The present solution provides mapping of plurality of actions, by scaling to higher dimension using time division multiplexing technique;

The present solution provides mapping of plurality of states, by using time division multiplexing technique.

While specific language has been used to describe the present disclosure, any limitations arising on account thereto, are not intended. As would be apparent to a person in the art, various working modifications may be made to the method in order to implement the inventive concepts as taught herein. The drawings and the foregoing description give examples of embodiments. Those skilled in the art will appreciate that the described elements may well be combined into a single functional element. Alternatively, certain elements may be split into multiple functional elements. Elements from one embodiment may be added to another embodiment. Clearly, the present disclosure may be otherwise variously embodied, and practiced within the scope of the following claims.

What is claimed is:

1. A method of reinforcement learning in a processing element, the method comprising:
   receiving, by a receiving module implemented in the processing element physically arranged in an N×N array structure of processing elements on an integrated circuit, at least one reward;
   computing, by a computing module implemented in the processing element, at least one Q-value in a two-dimensional array at time $t_n$, based on the at least one reward;
   storing, by the computing module, the at least one Q-value;
   repeating the Q-value computation in a three-dimensional array of the processing element at time $t_{n+1}$; and
   performing, by a time-division multiplexing module implemented in the processing element, time-division multiplexing to replace the at least one Q-value in the two-dimensional array with at least one Q-value computed in the three-dimensional array, wherein performing the time-division multiplexing comprises mapping the three-dimensional Q-value computation onto a same hardware, of the integrated circuit, on which the two-dimensional Q-value computation is mapped, thereby reducing a silicon area of the integrated circuit.

2. The method of claim 1, further comprising:
   storing, by a memory, the Q-value in the processing element.

3. The method of claim 2, further comprising:
   receiving, by an input-output controller, the Q-value from the processing element in a serial order.

4. The method of claim 1, wherein the at least one reward is received by the receiving module in a serial order.

5. A system of reinforcement learning in a processing element, the system comprising:
   a receiving module, implemented in the processing element physically arranged in an N×N array structure of processing elements on an integrated circuit, configured to receive at least one reward from a host;
   a computing module, implemented in the processing element, in communication with the receiving module, and configured to compute at least one Q-value in a two-dimensional array at time $t_n$, based on the at least one reward, wherein the computing module is further configured to store the at least one Q-value, and wherein the computing module is further configured to repeat the Q-value computation in a three-dimensional array of the processing element at time $t_{n+1}$; and
   a time-division multiplexing module, implemented in the processing element, in communication with the computing module, and configured to perform time-division multiplexing to replace the at least one Q-value in the two-dimensional array with at least one Q-value computed in the three-dimensional array, wherein to perform the time-division multiplexing, the time-division multiplexing module is configured to map the three-dimensional Q-value computation onto a same hardware, of the integrated circuit, on which the two-dimensional Q-value computation is mapped, thereby reducing a silicon area of the integrated circuit.

6. The system of claim 5, further comprising a memory, in communication with the computing module, and configured to store the Q-value in the processing element.

7. The system of claim 6, further comprising:
an input-output controller, in communication with the processing element, and configured to receive the Q-value from the processing element in a serial order.

8. The system of claim 5, wherein the at least one reward is received by the receiving module in a serial order.

9. A processing element configured to perform reinforcement learning, the processing element being physically arranged in an N×N array structure of processing elements on an integrated circuit, and the processing element comprising:
a receiving module configured to receive at least one reward from a host;
a computing module, in communication with the receiving module, and configured to compute at least one Q-value in a two-dimensional array at time $t_n$, based on the at least one reward, wherein the computing module is further configured to store the at least one Q-value, and wherein the computing module is further configured to repeat the Q-value computation a three-dimensional array of the processing element at time $t_{n+1}$; and
a time-division multiplexing module, in communication with the computing module, and configured to perform time-division multiplexing to replace the at least one Q-value in the two-dimensional array with at least one Q-value computed in the three-dimensional array, wherein to perform the time-division multiplexing, the time-division multiplexing module is configured to map the three-dimensional Q-value computation onto a same hardware, of the integrated circuit, on which the two-dimensional Q-value computation is mapped, thereby reducing a silicon area of the integrated circuit.

10. The processing element of claim 9, further comprising a memory, in communication with the computing module, and configured to store the Q-value in the processing element.

11. The processing element of claim 10, further comprising:
an input-output controller, in communication with the processing element, and configured to receive the Q-value from the processing element in a serial order.

12. The processing element of claim 9, wherein the at least one reward is received by the receiving module in a serial order.

* * * * *